United States Patent
Recio et al.

(10) Patent No.: US 10,326,272 B2
(45) Date of Patent: Jun. 18, 2019

(54) UNIFIED POWER FLOW CONTROLLER UTILIZING ENERGY SAVING DEVICES AT A POINT OF POWER CONSUMPTION

(71) Applicant: THE POWERWISE GROUP, INC., Boca Raton, FL (US)

(72) Inventors: Christopher John Recio, Boca Raton, FL (US); Zoran Miletic, Burnaby (CA); Michael Gerard Tobin, Boca Raton, FL (US)

(73) Assignee: The Powerwise Group, Inc., Boca Raton, FL (US)

( * ) Notice: Subject to any disclaimer, the term of this patent is extended or adjusted under 35 U.S.C. 154(b) by 110 days.

(21) Appl. No.: 15/361,039

(22) Filed: Nov. 24, 2016

(65) Prior Publication Data
US 2017/0149244 A1    May 25, 2017

Related U.S. Application Data

(60) Provisional application No. 62/259,181, filed on Nov. 24, 2015.

(51) Int. Cl.
| | |
|---|---|
| *H02J 3/16* | (2006.01) |
| *H02J 3/18* | (2006.01) |
| *H02J 3/32* | (2006.01) |
| *H02J 3/46* | (2006.01) |
| *H02M 5/42* | (2006.01) |

(52) U.S. Cl.
CPC .............. *H02J 3/16* (2013.01); *H02J 3/1814* (2013.01); *H02J 3/46* (2013.01); *H02M 5/42* (2013.01); *H02J 3/32* (2013.01); *Y02E 40/18* (2013.01)

(58) Field of Classification Search
CPC ...... G05F 1/66; G05F 1/70; H02J 3/16; H02J 3/1814; H02J 3/32; H02J 3/46; H02M 5/40; H02M 5/42; H02M 5/44; H02M 5/453; H02M 5/458; H02M 5/46; Y02E 40/18

See application file for complete search history.

(56) References Cited

U.S. PATENT DOCUMENTS

| | | | | |
|---|---|---|---|---|
| 2005/0012395 | A1* | 1/2005 | Eckroad | H02J 3/16 307/44 |
| 2006/0229767 | A1* | 10/2006 | Chu | H02J 3/00 700/286 |

(Continued)

*Primary Examiner* — Levi Gannon
(74) *Attorney, Agent, or Firm* — Ingram IP Law, P.A.

(57) ABSTRACT

A system and method are provided for regulating voltage received from an electric utility grid. A unified power flow controller is provided at a point of power consumption and includes a terminal electrically coupled to a power source, which receives a grid alternating current and a grid alternating voltage from the electric utility grid. A power converter is electrically coupled to the terminal and includes an active rectifier that converts substantially all of the grid alternating current to a direct current and an inverter that converts the direct current to a load alternating current and a load alternating voltage, the load alternating voltage being less than the grid alternating voltage. A transformer is provided having first terminals electrically coupled to the power source and second terminals electrically coupled to an output of the inverter. The transformer injects the load alternating voltage in series with the grid alternating voltage.

19 Claims, 11 Drawing Sheets

(56) References Cited

U.S. PATENT DOCUMENTS

| | | | | |
|---|---|---|---|---|
| 2007/0278988 A1* | 12/2007 | De | H02P 27/08 | 318/801 |
| 2012/0080420 A1* | 4/2012 | Hui | H02J 3/24 | 219/482 |
| 2013/0264865 A1* | 10/2013 | Sugeno | H02J 3/32 | 307/9.1 |
| 2014/0009980 A1* | 1/2014 | Divan | H02M 5/4585 | 363/37 |
| 2014/0022827 A1* | 1/2014 | Permuy | H02M 5/40 | 363/34 |
| 2014/0104896 A1* | 4/2014 | Tallam | H02M 5/4585 | 363/37 |
| 2014/0268926 A1* | 9/2014 | Gupta | H02M 5/44 | 363/35 |
| 2014/0281645 A1* | 9/2014 | Sen | G06Q 50/06 | 713/340 |
| 2015/0115905 A1* | 4/2015 | Hui | H02J 3/1814 | 323/207 |
| 2015/0180273 A1* | 6/2015 | Wagoner | H02M 1/12 | 290/50 |

\* cited by examiner

UNIFIED POWER FLOW CONTROLLER UTILIZING ENERGY SAVING DEVICES AT A POINT OF POWER CONSUMPTION

CROSS-REFERENCE TO RELATED APPLICATIONS

This application claims priority to U.S. Provisional Application 62/259,181, filed Nov. 24, 2015, the complete disclosure of which is incorporated herein by reference in its entirety.

FIELD OF THE TECHNOLOGY

The present disclosure relates generally to electric power and more particularly to regulating voltage delivered to customer sites from a generation facility and still more particularly to regulating, in substantially real-time, alternating voltage delivered to customer sites to obtain a low voltage value that allows energy savings.

BACKGROUND OF THE TECHNOLOGY

A conventional unified power flow controller ("UPFC") device is an electrical device that provides fast-acting reactive power compensation to high-voltage and medium-voltage electricity transmission networks. Conventional UPFC devices typically use a pair of three-phase controllable bridges to produce current that is injected into transmission lines using a series transformer. Conventional UPFC devices may simultaneously regulate active and reactive power flows in transmission lines. Typically, these conventional UPFC devices employ solid state devices that provide functional flexibility that is generally not attainable by conventional thyristor controlled systems. Conventional UPFC devices control parameters such as line reactance, phase angle, and voltage along transmission lines.

BRIEF DESCRIPTION OF THE DRAWINGS

Implementations of the present technology will now be described, by way of example only, with reference to the attached figures, wherein.

DETAILED DESCRIPTION OF THE TECHNOLOGY

Figure 1:
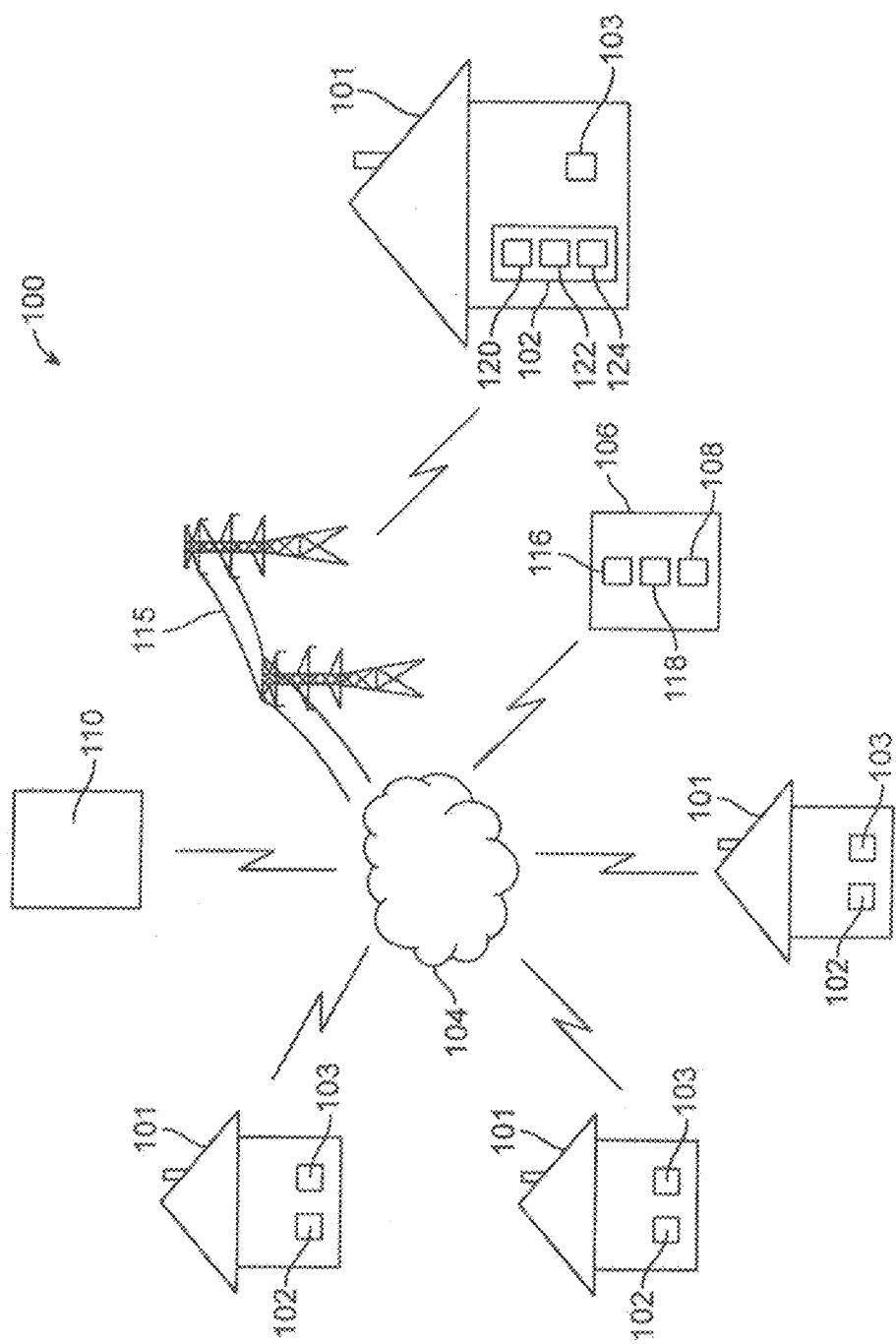
FIG. 1 illustrates an electric utility grid environment according to one example of the disclosure.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, signals, or other matter between the so-described components. The term "substantially" is defined to be essentially conforming to the thing that it "substantially" modifies, such that the thing need not be exact. For example, substantially real-time means that the occurrence may happen without noticeable delay, but may include a slight delay.

The terms "circuit," "circuitry," and "controller" may include either a single component or a plurality of components, which are either active and/or passive components and may be optionally connected or otherwise coupled together to provide the described function. The "processor" described in any of the various embodiments includes an electronic circuit that can make determinations based upon inputs and is interchangeable with the term "controller." The processor can include a microprocessor, a microcontroller, and a central processing unit, among others, of a general purpose computer, special purpose computer, ASIC, or other programmable data processing apparatus. While a single processor can be used, the present disclosure can be implemented over a plurality of processors.

The "server" described in any of the various examples includes hardware and/or software that provides processing, database, and communication facilities. By way of example, and not limitation, "server" may refer to a single, physical processor with associated communications and data storage and database facilities, or it can refer to a networked or clustered complex of processors and associated network and storage devices, as well as operating software and one or more database systems and applications software that support the services provided by the server.

The phrase "electric utility company" is defined as an entity that provides or manages the supply of electrical power or energy to one or more energy customers. The phrase as used in this disclosure encompasses, without limitation, regional utility companies, regional transmission organizations, and any other load servicing entities or entities that manage the power grid within a geographical area. Electric utility companies employ constant frequency generators to produce power at a constant fixed frequency such 60 Hz, 50 Hz, 400 Hz or the like. Energy customers may be any entity that uses electrical power for any purpose. For example, energy customer may include, without limitation, individual home owners, commercial office building tenants, manufacturing operations personnel, or the like. While specific examples described herein are directed to electric utility environments having alternating current such as power grids, one of ordinary skill in the art will readily appreciate that the technology described herein is applicable to any electrical distribution systems having alternating current such as for used in association with aircrafts, ships, submarines, or the like. Furthermore, one of ordinary skill in the art will readily appreciate that the technology described herein applies to electrical distribution systems having alternating current and operating at any fixed frequency such as 60 Hz, 50 Hz, 400 Hz, or the like.

A system and method are needed for conserving energy and promoting cost savings at a point of power consumption. Electrical power is typically delivered to customer sites at a nominal voltage of 120/127/230 $V_{rms}$, which is a target voltage an electrical utility company aims to supply at a point of power consumption. This nominal voltage can fluctuate by plus or minus 10% or more when ultimately delivered at the point of power consumption. Typically, appliance manufacturers design appliance electronics to operate in a normal manner throughout the plus or minus 10% voltage fluctuation. In other words, appliance manufacturers design appliance electronics to operate in a normal manner from the low voltage range of minus 10% to the high voltage range of plus 10%. Appliances receiving voltages above the low range of minus 10% are over supplied with voltage, which results in wasted electrical power and increased operational cost to the consumer.

A system and method are needed to regulate an alternating current (AC) voltage at a point of power consumption. For example, the AC voltage delivered to customer sites from a generation facility may be reduced to the low voltage value. This voltage reduction will result in energy savings to the consumer while maintaining normal operation of appliances. Furthermore, a system and method are needed to more efficiently regulate AC voltage delivered to customer sites. According to one example, a unified power flow controller ("UPFC") device is provided having an energy saving device incorporated therein. The energy saving device allows the UPFC device to operate as a low-voltage UPFC device.

According to one example, the UPFC device may include a line frequency injection transformer that injects a voltage in series with a line voltage delivered from an electric utility company. The UPFC device is provided at the point of power consumption to regulate a voltage value delivered to the customer site. According to one example, the line frequency injection transformer includes first terminals that are electrically coupled to a grid power source and second terminals that are electrically coupled to an output of a power converter that operates as an energy saving device. According to one example, the efficiency of the UPFC device is enhanced at least because the line frequency injection transformer processes a fraction of power delivered from the grid power source. For example, if the grid alternating voltage fluctuates between 110-150V, then the line frequency injection transformer injects between 0-40V in series with the grid alternating voltage to maintain a desired 110V low voltage value. Providing the low-voltage UPFC devices at the point of power consumption increases an overall system efficiency as compared to providing an energy saving device at the customer sites without the UPFC device. According to one example, regulating the voltage value at the point of power consumption may increase an overall efficiency of the system as compared to regulating the voltage values at locations between the generation facility and the customer sites.

For the purposes of this disclosure a computer readable medium stores computer data in machine readable form. By way of example, and not limitation, the computer readable medium may include computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium that may be used to store the desired information and which can be accessed by the computer.

The terms "comprising," "including" and "having" are used interchangeably in this disclosure. The terms "comprising," "including" and "having" mean to include, but are not necessarily limited to the things so described.

The below description references block diagrams and operational illustrations of methods and devices that regulate voltage the point of power consumption. It is understood that each block of the block diagrams or operational illustrations, and combinations of blocks in the block diagrams or operational illustrations, can be implemented with analog or digital hardware and computer program instructions. The computer program instructions may be provided to a processor that executes the computer program instructions to implement the functions/acts specified in the block diagrams or operational block or blocks. In some alternative implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Electric utility companies employ transformers positioned close to customer sites to regulate voltage values delivered to the customer sites. Typically, the transformers are located along the transmission lines at points prior to the customer sites. According to one example, the transformers typically include a tap changer that provides a variable turns ratio that enables stepped voltage regulation at the output. A transformer may be provided to regulate voltage at a single customer site or across multiple customer sites.

This disclosure describes systems and methods of regulating voltage values at a point of power consumption using low-voltage UPFC devices. The UPFC devices are provided at customer sites and are optimized to increase an overall efficiency of the voltage regulation devices provided within the UPFC devices. According to one example, the UPFC devices may include energy saving devices having power converters that include active rectifiers that are configured as inverters to source and absorb reactive power within the distribution system. According to one example, an amount of reactive power that may be sourced to the electric utility grid is determined based on an amount of electric power available during periods of power consumption at the customer site. For example, if a UPFC device is rated at 30 amps at 120 volts, then the UPFC device may provide up to 3,600 kVA of real power or reactive power. This real power or reactive power may be delivered to the customer site or to the electric utility grid as real power, reactive power, or a combination of both. With respect to sourcing reactive power back to the electric utility grid, if the customer site is consuming 2,000 kVA, then the UPFC device may source up to the remaining 1,600 kVA back to the electric utility grid.

FIG. 1 illustrates one example of an electric utility grid environment 100. A customer site 101 such as a residential building, a commercial building, or the like, is provided with energy consuming devices or loads. For example, the energy consuming devices may include computers, refrigerators, televisions, climate control systems such as heating and air conditioning systems, motors, pumps, commercial or manufacturing devices, or the like. According to one example, UPFC devices 102 may be provided at the customer sites 101 to regulate voltage values at the point of power consumption. A plurality of the UPFC devices 102 may be communicatively coupled to a remote server. Alternatively, each UPFC device 102 may be communicatively coupled to a computing device that is located within a corresponding customer site 101.

The UPFC devices 102 may be communicatively coupled to a corresponding power meter 103 provided at the customer site 101. Electric power is transmitted to the customer site 101 over transmission lines 115 that form part of an electric utility grid. According to one example, the UPFC device 102 may be communicatively coupled to the electric utility grid via a network 104 such as the Internet, a cellular communications network, a private wide area network ("WAN"), a power line communications ("PLC") network, or any other suitable communications technology. The network 104 may be connected to the Internet via conventional routers and/or firewalls. The network 104 also may be connected to a common carrier wireless network such as a CDMA network. The network 104 also may be connected to a wide area network that is connected to the PLC network.

The UPFC device 102 may include an onboard computer having a processor 120 that may be communicatively coupled to a computer readable media 122. The UPFC devices 102 may include a display device 124 having a graphical user interface that enables customers to control features of the UPFC device 102. For example, a consumer may provide energy saving parameters at the point of power consumption, including a desired root-mean-square voltage value, a desired voltage reduction percentage, and a desired savings reduction percentage. Alternatively, the UPFC devices 102 may be remotely controlled by a customer computer via the network 104. Still further, the UPFC devices 102 may be remotely controlled by an electric utility company or another third party via the network 104. Software applications are provided at the UPFC device 102 for interfacing with the power meter 103, the energy consuming devices, and an application server 106 described below, among other components. The software applications may include instructions that are executed by the processor 120.

The power meter 103 is provided at the point of power consumption or customer site 101 to measure power consumed by the energy consuming devices therein. According to one example, the power meter 103 may be furnished by the electric utility company servicing the corresponding customer site 101. Alternatively, the power meter 103 may be furnished by an entity that is different from the electric utility company. In this case, the power meter 103 may replace any power meter furnished by the electric utility company. Alternatively, the power meter 103 may be communicatively coupled to a power meter furnished by the electric utility company, such as being communicatively coupled in serial fashion. Power may enter the customer site 101 via the power meter 103 and the UPFC device 102.

According to one example, the power meter 103 may be programmed to measure power consumption in substantially real-time. Accordingly, the power meter 103 may measure the power consumed at the customer site 101 in substantially real-time and may communicate power consumption data to the UPFC device 102 at preselected intervals. The computer readable media 122 may store data such as the power consumption data or may provide backup or archive for the data received at the UPFC device 102. The preselected intervals may include time intervals such as real-time or continuous, seconds-based, minute-based, hours-based, day-based, month-based, or the like. One of ordinary skill in the art will readily appreciate that other preselected intervals may include intervals triggered by a percentage change in energy consumption, an aggregated amount of energy consumed, a time of day, a day of a month, or the like. One of ordinary skill in the art also will readily appreciate that the UPFC devices 102 and the power meters 103 may be provided in a combined unit or may be provided as separate units.

Referring to FIG. 1, an application server 106 may be provided that communicates with the plurality of UPFC devices 102. The application server 106 may communicate with the plurality of UPFC devices 102 via a network 104 such as the Internet, a cellular communications network, a private WAN, a PLC network, or any other suitable communications technology. According to one example, the network 104 may be associated with a preselected area. For example, the network 104 may be associated with a geographic area such as a street, a neighborhood, a zip code, a county, a state, a region, or the like. The plurality of UPFC devices 102 may be assigned an Internet Protocol (IP) address to track corresponding location information. One of ordinary skill in the art will readily appreciate that other technology may be used to obtain location information.

The application server 106 may include an onboard computer having a processor 116 that is communicatively coupled to a computer readable media 118 that stores data such as in a database. The application server 106 may include a display device having a graphical user interface that enables the electric utility company to control the application server 106. Alternatively, the application server 106 may be remotely controlled by the electric utility company or other third party via the network 104. Software applications are provided at the application server 106 for interfacing with the UPFC device 102, the power meter 103, and the energy consuming devices, among other components. The software applications may include instructions that are executed by the processor 116.

According to one example, the UPFC device 102 may communicate with the power meter 103 and the application server 106 via the network 104. The network 104 may support a transmission control protocol/Internet protocol (TCP/IP) connection, for example, and may be accessed over a cellular communications channel, Wi-Fi, a wired connection, or the like. Once the connection is established, an application may communicate and instruct the UPFC devices 102 to regulate voltage at the point of power consumption in real-time. Voltage regulation data received from all other UPFC devices 102 may be aggregated to develop an instantaneous aggregate voltage regulation profile.

According to one example, the UPFC device 102 may communicate with a corresponding application server 106 to provide voltage regulation data for corresponding customer sites 101. The computer readable media 118 may store data such as an amount of energy saved due to voltage regulation or may provide backup or archiving for the data received at the application server 106. At preselected intervals, the plurality of UPFC devices 102 may communicate data corresponding to the amount of energy saved due to voltage regulation to the corresponding application server 106. For example, the preselected intervals may include time intervals such as real-time or continuous, seconds-based, minute-based, hours-based, day-based, month-based, or the like. One of ordinary skill in the art will readily appreciate that other preselected intervals may include intervals triggered by a percentage change in an amount of energy saved due to voltage regulation, an aggregated amount of energy saved due to voltage regulation, a time of day, a day of a month, or the like.

According to one example, a software application 108 (hereinafter "application 108") may interface with the application server 106 to access data corresponding to the amount of energy saved due to voltage regulation at the corresponding customer sites 101. For example, the application 108 may include instructions that are executed on a processor to aggregate for analysis the data corresponding to the amount of energy saved due to voltage regulation. According to one example, the application 108 may analyze the aggregated amount of energy saved due to voltage regulation data obtained from the plurality of UPFC devices 102 to determine aggregated amounts of energy saved due to voltage regulation. The aggregated amounts of energy saved due to voltage regulation may be determined over any time period such as instantaneously, over an hourly period, a daily period, a weekly period, a monthly period, or the like. Furthermore, the application 108 may analyze additional data during the corresponding time period. The additional data may include environmental data, weather data, or the like. According to one example, the application 108 may analyze the aggregated amounts of energy saved due to voltage regulation and/or the additional data to predict future amounts of energy saved due to voltage regulation over a pre-selected time period.

According to one example, the application 108 may reside in the computer readable media 118 of the application server 106. Alternatively, the application 108 may reside at a remote client device 110 that is communicatively coupled to the application server 106. The remote client device 110 may communicate with the application server 106 via a network 112. The network 112 may support a TCP/IP connection, for example, via the Internet, a cellular communications network, a private WAN, a PLC network, or any other suitable communications technology. The network 112 may be connected to the Internet via conventional routers and/or firewalls. The network 112 also may be connected to a common carrier wireless network such as a CDMA network. The network 112 also may be connected to a wide area network that is connected to the PLC network.

Figure 2:
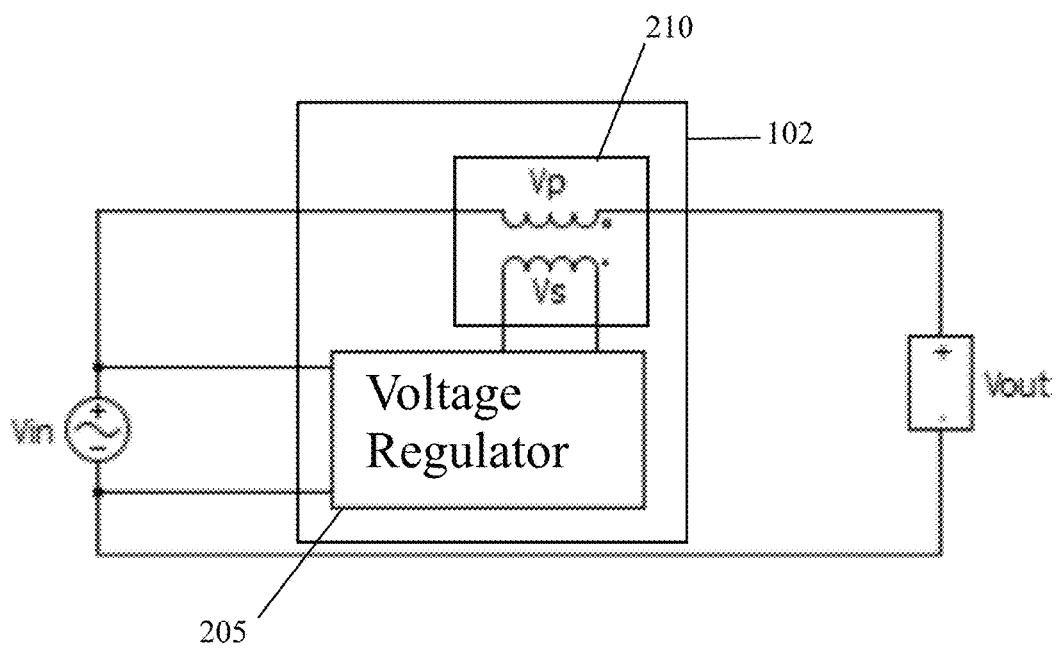
FIG. 2 illustrates a unified power flow controller within an operational environment according to one example of the disclosure.

FIG. 2 illustrates one example of a technology that includes a UPFC device 102 having an energy saving device or voltage regulator 205 incorporated therein. The voltage regulator 205 allows the UPFC device 102 to operate at low voltage compared to the alternating voltage value delivered by an electric utility company. According to one example, the UPFC device 102 performs voltage regulation at a point of power consumption by an end customer. For example, the point of power consumption may include customer sites 101 such as homes, businesses, or the like. The UPFC device 102 may include a line frequency injection transformer 210 provided in series with $V_{in}$ to regulate the output voltage $V_{out}$. The UPFC device 102 may include a high frequency power converter that drives the transformer 210 by injecting voltage in-line with a voltage source $V_{in}$. If the transformer 210 injects the voltage in-phase with the voltage source $V_{in}$, then the output voltage $V_{out}$ is the sum of the injected voltage value and $V_{in}$. Alternatively, if the transformer 210 injects the voltage out-of-phase with the voltage source $V_{in}$, then the output voltage $V_{out}$ is the difference of the injected voltage value and $V_{in}$.

Figure 3:
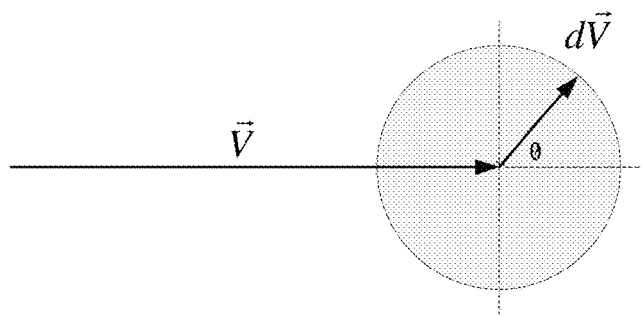
FIG. 3 illustrates a power factor when viewed from the electric utility grid side of the voltage regulator of FIG. 2 according to one example of the disclosure.

FIG. 3 illustrates a polar diagram of real power (P) on the x-axis and reactive power (Q) on the y-axis for the energy saving device 205 having a passive or resistive load. The energy saving device 205 is electrically coupled to an electric utility grid that supplies reactive power. V represents an input voltage phasor, dV represents a voltage injected by the UPFC device 102, and θ represents an angle of injection. A magnitude of the output voltage $V_{out}$ may be controlled by adjusting the injection phase angle θ and/or a magnitude of the injected voltage dV. According to one example, the UPFC device 102 may operate in a voltage range of 100V-300V. One of ordinary skill in the art will readily appreciate that the UPFC device 102 may operate over a broader voltage range.

According to one example, the energy saving device or voltage regulator 205 may include a power converter having an active rectifier that converts substantially all of the AC voltage and current received from the electric utility grid to a direct current voltage and current. According to one example, an energy storage device such as a capacitor, battery, or the like may be provided at a DC bus to store energy supplied by the direct current. The active rectifier may source the reactive power component and the stored energy back to the electric utility grid on demand in order to adjust reactive power values at the customer site 101. According to one example, an amount of charge available to the energy storage device may be based upon a difference between power received at the active rectifier and power delivered to the load. For example, if 10 kW is received at the active rectifier and 5 kW is delivered to the load, then 5 kW is available to charge the energy storage device. The power converter may be controlled to prevent power disruptions at the customer sites 101. Alternatively, the energy saving device 205 may not store energy received from the active rectifier. In this case, active rectifier may pass the DC current and voltage to an inverter as discussed below.

Figure 7:
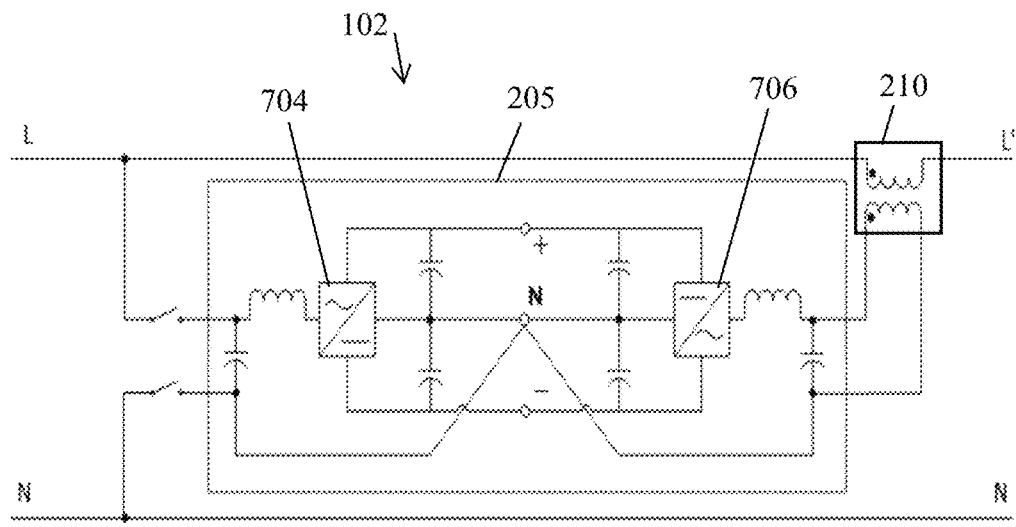
FIG. 7 illustrates a single phase unified power flow controller within an operational environment according to another example of the disclosure.

According to one example, the UPFC device 102 may regulate voltage and current delivered to the load at the point of power consumption. For example, the voltage regulator 205 and the line frequency injection transformer 210 may regulate voltage and current using a flexible alternating current transmission system. With reference to FIG. 7, the voltage regulator 205 provided within the UPFC device 102 may include a power converter having a rectifier 704 and an inverter 706 provided with an intermediate direct current ("DC") bus that stores energy supplied by the direct current supplied by the rectifier 704. FIG. 7 illustrates capacitors as the energy storage devices. According to another example, the energy storage devices may include batteries or the like provided at the DC bus. According to another example, the UPFC device 102 may be incorporated into a power meter 103 that is placed in a utility meter socket at the customer site 101. Alternatively, the UPFC device 102 may be positioned proximate to the utility meter socket at the customer site 101.

According to one example, the UPFC device 102 may be located at a service entrance of the point of power consumption such as a home or business. According to one example, the UPFC device 102 may be accessed directly or remotely by an electric utility company. According to one example, the application servers 106 may access one or more UPFC devices 102 or voltage regulators 102 to regulate voltage delivered at the point of power consumption from a generation facility. One of ordinary skill in the art will readily appreciate that accessing a plurality of UPFC devices 102 at various customer sites 101 may provide improved performance as compared to accessing a single UPFC device 102 at a single customer site 101. One of ordinary skill in the art will readily appreciate that the UPFC devices 102 may be used within the distribution systems of residential, commercial, and industrial buildings, among other distribution systems. In commercial or industrial environments, building managers may be granted access to program the UPFC devices 102 to regulate voltage delivered at the point of power consumption from a generation facility.

Figure 4A:
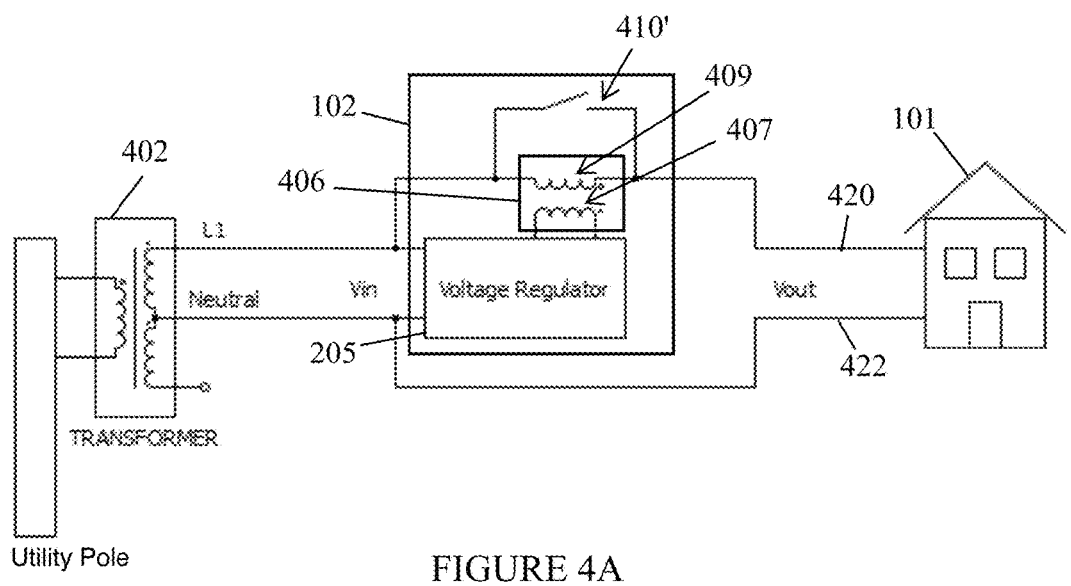
FIG. 4A illustrates a single phase unified power flow controller within an operational environment according to one example of the disclosure.

FIG. 4A illustrates one example of the technology used within an operational environment. According to one example, the UPFC device 102 may be situated in a residential environment between a pole transformer 402 and a home 101. According to one example, the UPFC device 102, with the energy saving device 205 incorporated therein, may operate to regulate an AC voltage value delivered at the point of power consumption or home 101. For simplicity, FIG. 4A illustrates a single phase connection. One of ordinary skill in the art will readily appreciate that a two phase connection may be implemented to provide approximately 220V to the home 101. Furthermore, one of ordinary skill in the art will readily appreciate that a three phase connection may be implemented.

According to one example, the voltage regulator 205 may be configured to regulate AC voltage and current delivered to loads at the point of power consumption by a distribution system associated with residential and/or commercial structures 101. Voltage regulation may be performed to save energy by restricting voltage levels from rising above a desired threshold value. One of ordinary skill in the art will readily appreciate that maintaining voltage levels above a threshold voltage level may result in power waste. According to one example, a bridge design may be employed to adjust reactive power while also regulating AC voltage values.

Figure 5:
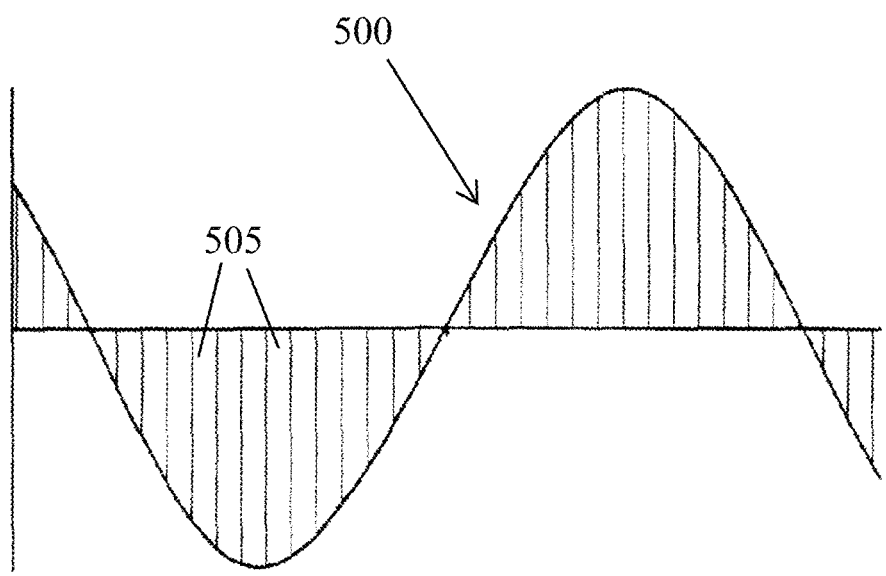
FIG. 5 illustrates a waveform diagram corresponding to an output of a voltage regulator according to one example of the disclosure.

According to one example, the voltage regulator 205 may include IGBT and/or FET drive control devices that perform pulse width modulation to reduce analog signals received from an incoming sine wave. Pulse width modulation allows a reduced analog signal to maintain an original shape of the input sine wave. FIG. 5 illustrates one example of a sine wave 500 depicted with a plurality of slices 505 that may be maintained or removed from an area under a curve of the modulating sine wave by the IGBT/FET drive control devices. The slices 505 may be removed to reduce a voltage value without the attendant harmonics previously associated with such voltage control. The IGBT/FET devices may be employed to control the on and off triggering point along the modulating sine wave 500. One technology that may be employed to modify the voltage value of a modulating sine wave 500 is described in U.S. Pat. No. 8,085,009 issued on Dec. 27, 2011, which is incorporated herein by reference in its entirety. Another technology that may be employed to modify the voltage value of a modulating sine wave is described in U.S. patent application Ser. No. 14/451,891 filed on Aug. 5, 2014, which is incorporated herein by reference in its entirety.

Since IGBT and FET devices are unipolar in nature, at least one IGBT/FET drive control device is employed to control each half cycle of alternating current (AC) signals. Furthermore, steering diodes may be employed to route each half cycle signal to an appropriate device in order to avoid reverse biasing. If each half cycle is modulated on a mark space ratio of 90%, then the area under the curve may be reduced by 10%. An overall effect may be realized when the root-mean-square (RMS) value, which is the square root of the time average of the square of a quantity, is measured and the output voltage is seen to be reduced by a percentage similar to the mark space ratio employed. Alternatively, for a periodic quantity, the average may be taken over one complete cycle, which is also referred to as the effective value. A reduced voltage value results in a reduced current, which leads to reduced power consumption.

Returning to FIG. 4A, the UPFC device 102 includes a transformer 406 with a magnetic core that is surrounded by windings 407,409. According to one example, a first terminal of the transformer winding 407 may be coupled to a line voltage through the voltage regulator or energy saving device 205. According to one example, a second terminal of the transformer winding 407 may be coupled to neutral line through the voltage regulator 205. According to one example, first and second terminals of the transformer winding 409 may be coupled to the line voltage that terminates at the home 101. Current may pass through the windings 407,409 of the transformer 406 to increase a magnetic field within the magnetic core. According to one example, voltage value $V_{out}$ at the UPFC device 102 may be increased when the current passing through the windings 407,409 increases a magnetic field within the magnetic core. Alternatively, the voltage value $V_{out}$ may be decreased when the current passing through the windings 407,409 of the transformer 406 decreases the magnetic field within the magnetic core.

Figure 4B:
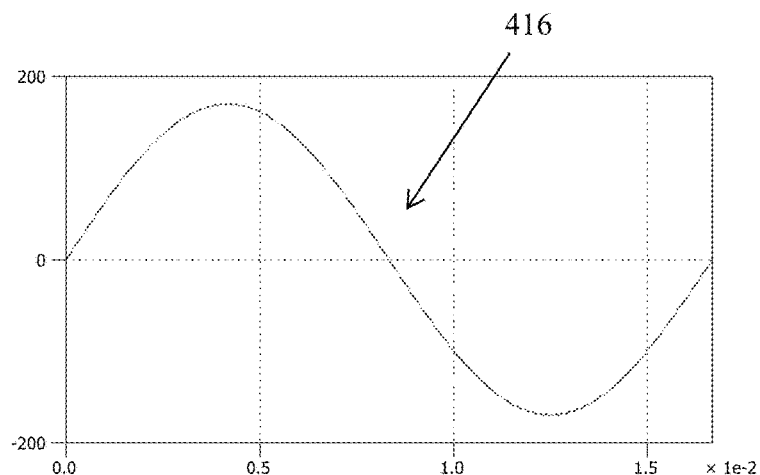
FIG. 4B illustrates a power waveform diagram taken at an output of the transformer illustrated in FIG. 4A.
Figure 4C:
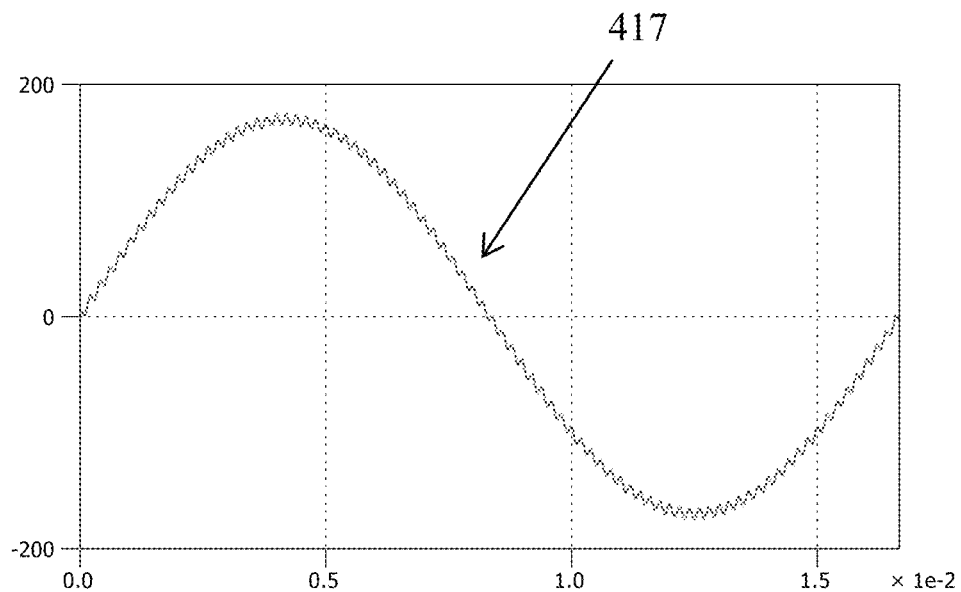
FIG. 4C illustrates a power waveform diagram taken at an input of the transformer illustrated in FIG. 4A.

An advantage of employing the transformer 406 to adjust the value of $V_{out}$ is that minimal harmonics may be introduced into the system. FIG. 4B illustrates waveform 416 having a few ripple harmonics as observed at the transformer windings 409 coupled to a main voltage line 420 of the home 101. FIG. 4C illustrates waveform 417 having substantial harmonics as observed at the transformer windings 407 coupled to the voltage regulator 205. According to one example, the harmonic signals at the transformer windings 407 are suppressed at the transformer windings 409 because the current value contributed from the transformer windings 407 is smaller than the current value at the transformer windings 409. For example, the current value passing through the transformer windings 407 may be 10% of the current value at the transformer windings 409. For example, in a 100 A system, 90 A may pass through the transformer windings 409 whereas 10 A may pass through transformer windings 407. In this case, the power delivered to the home 101 will have few harmonics since 90% of the current received at the home 101 passes through the transformer windings 409 having few harmonics. Stated differently, a combination of waveforms 416,417 results in an overall power signal having few harmonics. As a point of comparison, substantial harmonics may be introduced into the system when the value of $V_{out}$ is adjusted along the main voltage line 420. In this case, the power delivered to the home 4101 may have substantial harmonics since a majority of the power received at the home 101 passes through the transformer windings 409 having substantial harmonics.

A disadvantage of employing the transformer 406 within the UPFC device 102 is a potential loss of system efficiency due to transformer characteristics. According to one example, transformer core losses may render the system less efficient. For example, transformer efficiency may vary based on changing power conditions. According to one example, transformer efficiency may decrease with power conditions below a certain threshold and may increase with power conditions above a certain threshold. For example, the threshold may be 35% of system power, among other threshold values. One of ordinary skill in the art will readily appreciate that transformer efficiency may vary based on different characteristics.

Referring to FIG. 4A, a switch 410 (not shown) provided within the UPFC device 102 may be activated to bypass the transformer 406. The switch 410 may be coupled between the first and second terminals of windings 407. For example, the switch 410 may be activated when the system efficiency falls below a desired system efficiency. In this case, the line voltage $V_{out}$ delivered to the home 101 is determined by the line voltage at the pole transformer 402 without any voltage adjustment by the voltage regulator or energy saving device 205. In this case, the transformer 406 is bypassed and therefore does not perform any voltage adjustments to the line voltage. One of ordinary skill in the art will readily appreciate that the switch 410 may be activated manually or under control of a microprocessor.

Alternatively, a switch 410' provided within the UPFC device 102 may be activated to bypass both the voltage regulator 205 and the transformer 406. For example, this may occur when the system efficiency falls below the desired system efficiency or the pole transformer 402 provides a desired voltage value. In this case, the line voltage $V_{out}$ delivered to the home 101 is determined by the voltage delivered from the pole transformer 402 without any voltage adjustment by the voltage regulator 205 or the transformer 406. One of ordinary skill in the art will readily appreciate that switches 410,410' may be activated for a variety of reasons. One of ordinary skill in the art will readily appreciate that the switch 410' may be activated manually or under control of a microprocessor.

Figure 6:
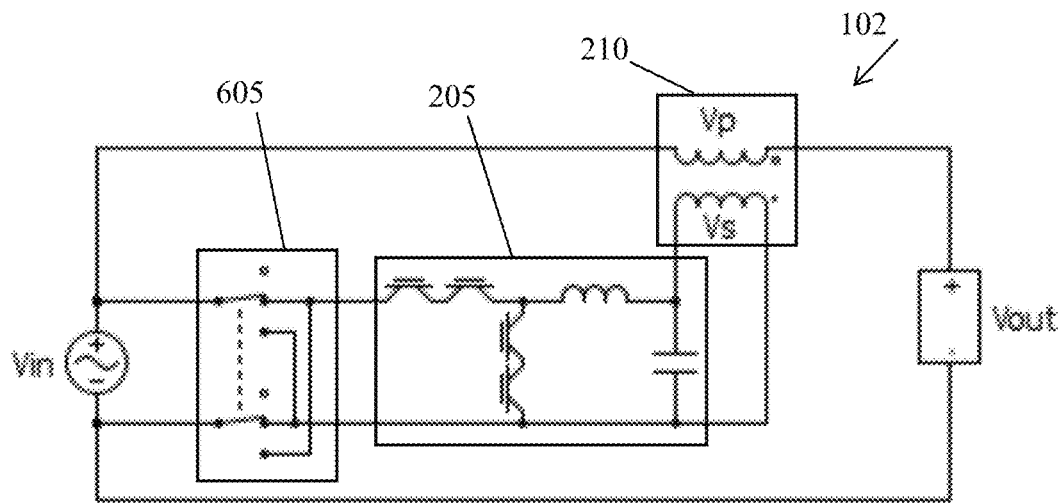
FIG. 6 illustrates a single phase unified power flow controller within an operational environment according to one example of the disclosure.

FIG. 6 illustrates one example of a single phase UPFC device 102 having a voltage regulator or energy saving device 205 incorporated therein. A high frequency power converter may be provided to drive the transformer 210 by injecting voltage in-line or in series with a voltage source $V_{in}$. According to one example, the energy saving device 205 may be configured to buck or reduce the voltage value so that $V_{out}$ is less than $V_{in}$. In this configuration, the voltage regulator 205 does not store energy. According to another example, contactors 605 may be provided within the UPFC device 102 to configure the energy saving device 205 to increase the voltage value so that $V_{out}$ is greater than $V_{in}$. One of ordinary skill in the art will readily appreciate that the contactors 605 may be activated manually or electronically via a microprocessor.

FIG. 7 illustrates another example of a single phase UPFC device 102 having an energy saving device 205 incorporated therein. A high frequency power converter may be provided to drive the transformer 210 by injecting voltage in-line with a voltage source $V_{in}$. The energy saving device 205 may be configured to buck or boost voltage. An active rectifier 704 is provided on a grid side of the energy saving device 205. The active rectifier 704 includes an AC component and a DC component. An inverter 706 is provided on a load side of the single phase energy saving device 205. The inverter 706 includes a DC component and an AC component. The DC components of the rectifier 704 and inverter 706 are independent with respect to each other and include capacitors and inductors. For example, the DC components of the rectifier 704 and the inverter 706 may include capacitors that store energy for subsequent discharge. With reference to FIG. 3, the portion of the polar diagrams to the left of the y-axis corresponds to power output from the rectifier 704 and the portion of the polar diagrams to the right of the y-axis corresponds to power output from the inverter 706. Furthermore, the portion of the polar diagrams above the x-axis corresponds to sourcing of power while the portion of the polar diagrams below the x-axis corresponds to absorption of power.

Figure 8:
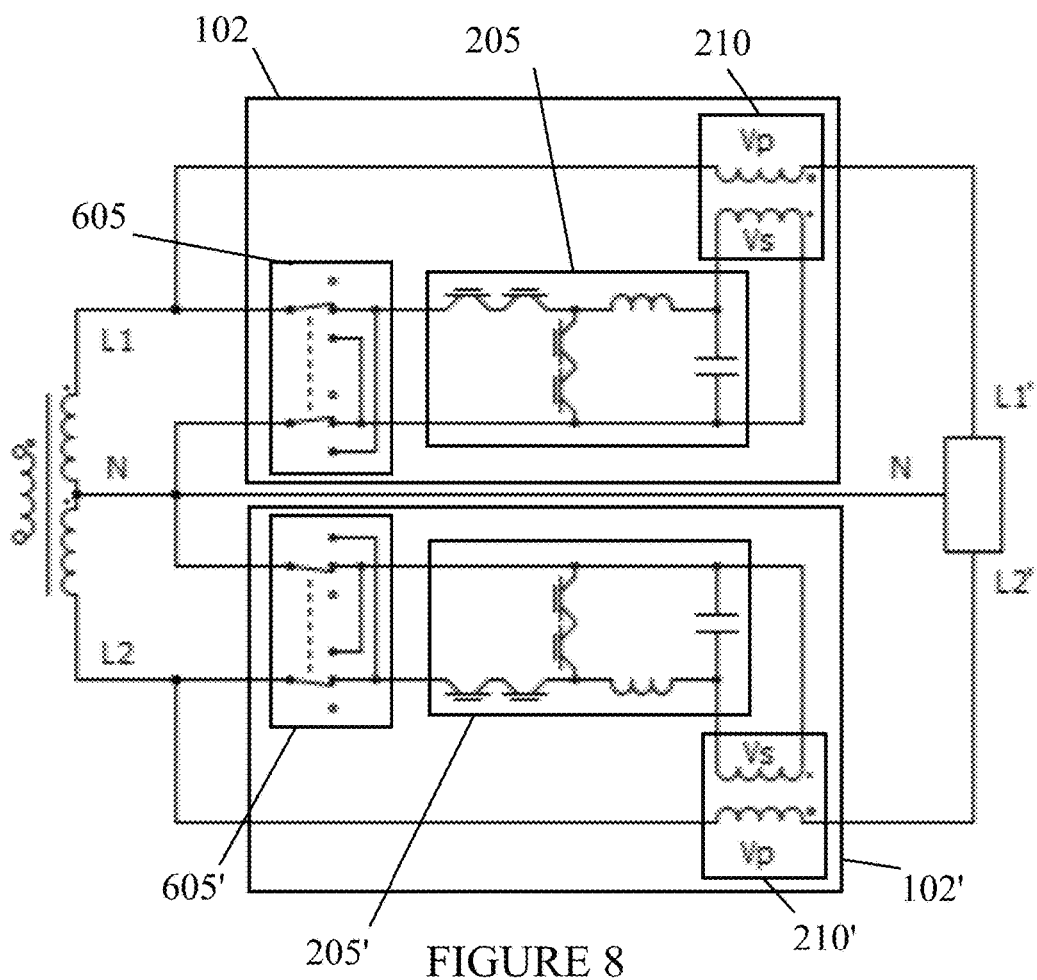
FIG. 8 illustrates a split phase unified power flow controller within an operational environment according to one example of the disclosure.

FIG. 8 illustrates one example of a split phase UPFC device 102 having two voltage regulators or energy saving devices 205,205' incorporated therein. Two high frequency power converters may be provided to drive the transformers 210,210' by injecting voltage in-line with a voltage source $V_{in}$. According to one example, the energy saving devices 205,205' may be configured to buck or reduce the voltage value so that $V_{out}$ is less than $V_{in}$. According to another example, contactors 605,605' may be provided within the UPFC device 102 to allow the energy saving devices 205, 205' to increase the voltage value so that $V_{out}$ is greater than $V_{in}$. One of ordinary skill in the art will readily appreciate that the contactors 605,605' may be activated manually or electronically via a microprocessor.

Figure 9:
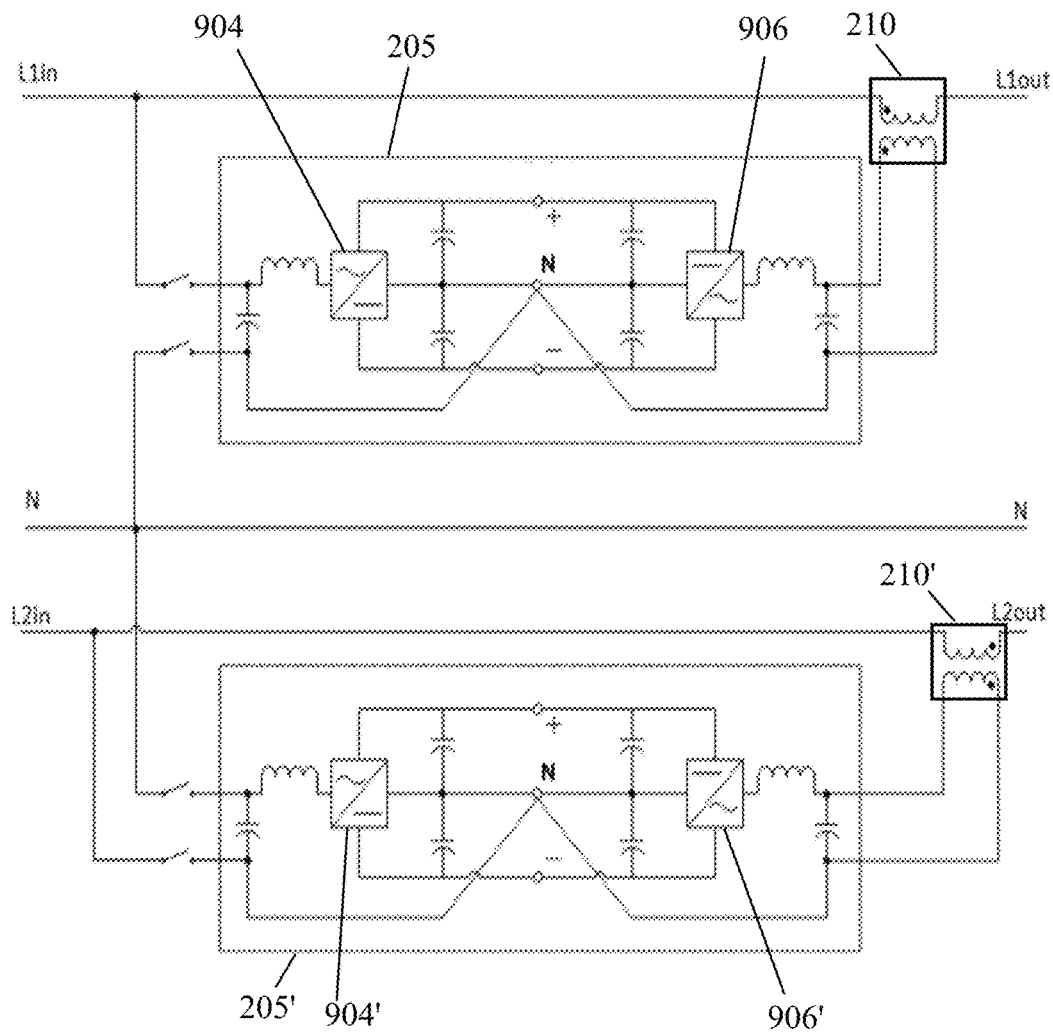
FIG. 9 illustrates a split phase unified power flow controller within an operational environment according to one example of the disclosure.

FIG. 9 illustrates another example of a split phase UPFC device 102 having two voltage regulators or energy saving devices 205,205' incorporated therein. Two high frequency power converters may be provided to drive the transformers 210,210' by injecting voltage in-line with a voltage source $V_{in}$. According to one example, the energy saving devices 205,205' may be configured to buck or boost the voltage $V_{in}$. With this split phase configuration, a neutral line may be passed through from a grid side such as transformer to a load side such as a home. According to one example, the line injection transformers 210,210' may be operated out of phase or 180 degrees apart. Additionally, the UPFC devices 102 or controllers may be synchronized to the grid. Active rectifiers 904, 904' are provided on a grid side of the split phase energy saving devices 205,205'. The active rectifiers 904, 904' include an AC component and a DC component. Inverters 906,906' are provided on a load side of the split phase energy saving devices 205,205'. The inverters 906, 906' include a DC component and an AC component. The DC components of the rectifiers 904,904' and inverters 906,906' are independent with respect to each other and include capacitors and inductors. According to one example, the DC components of the rectifiers 904,904' and the inverters 906,906' may include capacitors that store energy for subsequent discharge.

Figure 10:
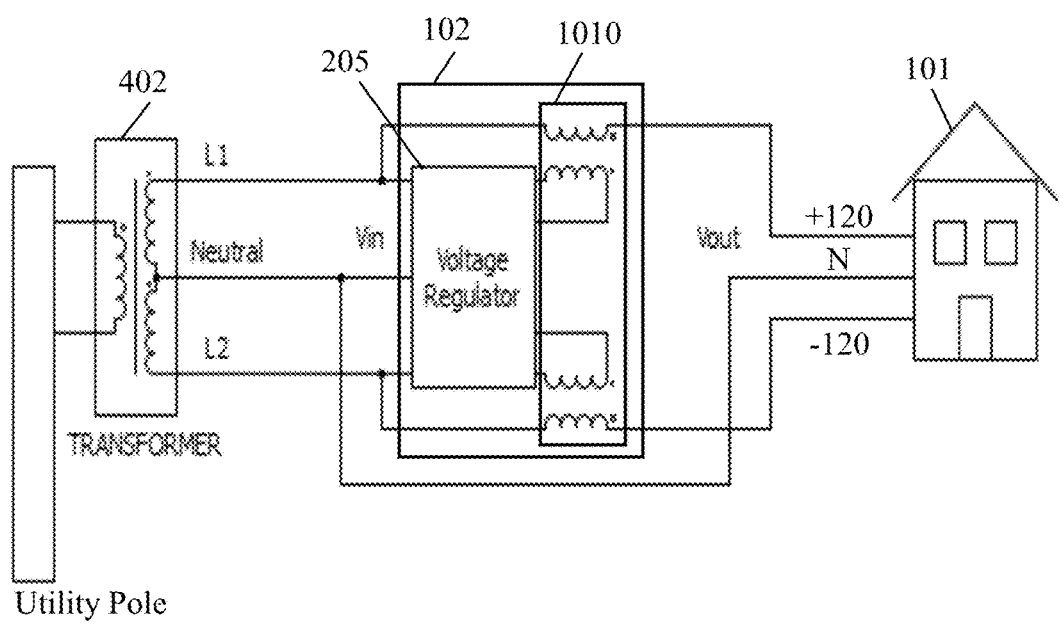
FIG. 10 illustrates a split phase unified power flow controller having a single core transformer within an operational environment according to one example of the disclosure.

FIG. 10 illustrates another example of a split phase UPFC device 102 having a single core transformer 1010 and an energy saving device 205 incorporated therein. High frequency power converters may be provided to drive the transformer 1010 by injecting voltage in-line with a voltage source $V_{in}$.

Figure 11:
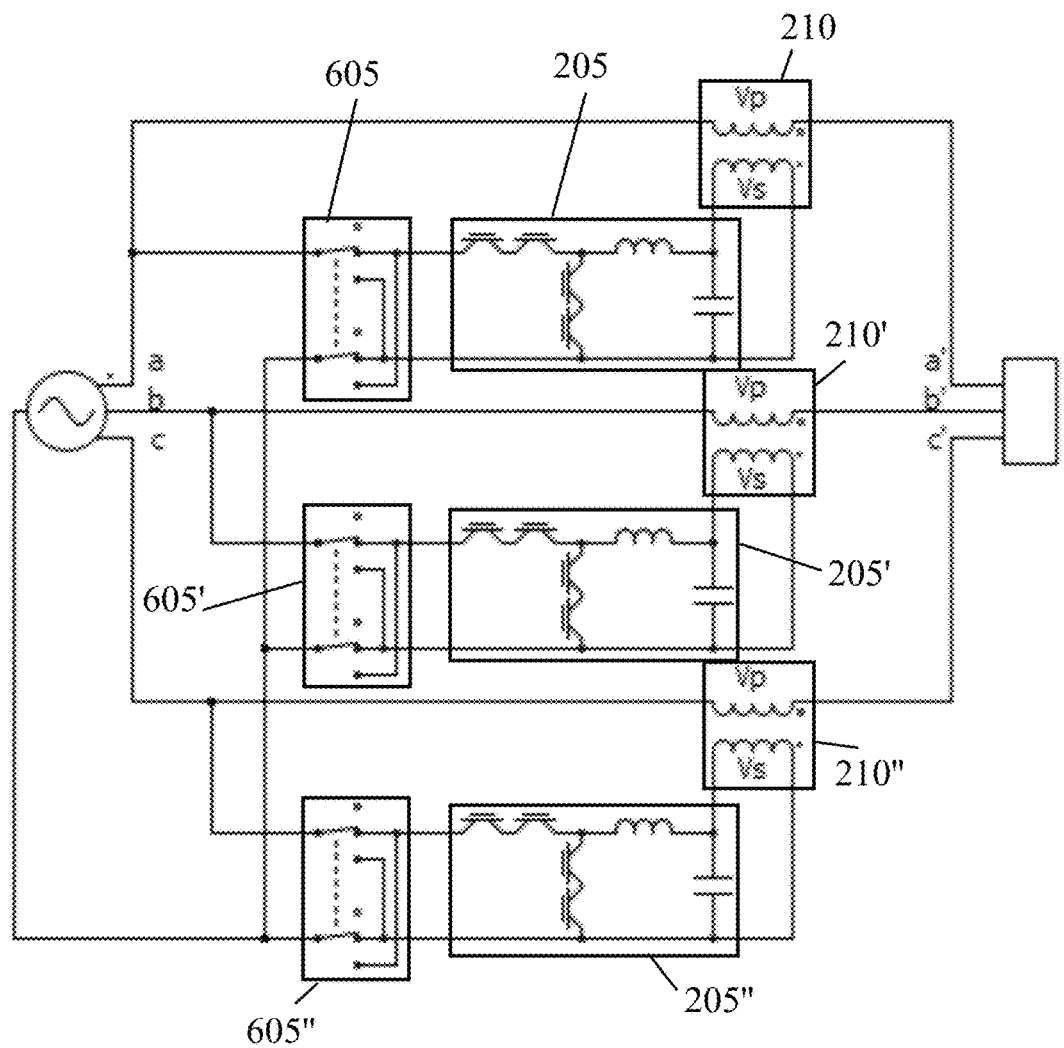
FIG. 11 illustrates a three phase unified power flow controller within an operational environment according to one example of the disclosure.

FIG. 11 illustrates one example of a three phase UPFC device 102 having three voltage regulators or energy saving devices 205,205',205" incorporated therein. Two high frequency power converters may be provided to drive the transformers 210,210',210" by injecting voltage in-line with a voltage source $V_{in}$. According to one example, the energy saving devices 205,205',205" may be configured to buck the voltage value so that $V_{out}$ is less than $V_{in}$. According to another example, contactors 605,605',605" may be provided within the UPFC device 102 to configure the energy saving devices 205,205',205" to increase the voltage value so that $V_{out}$ is greater than $V_{in}$. One of ordinary skill in the art will readily appreciate that the contactors 605,605',605" may be activated manually or electronically via a microprocessor.

Figure 12:
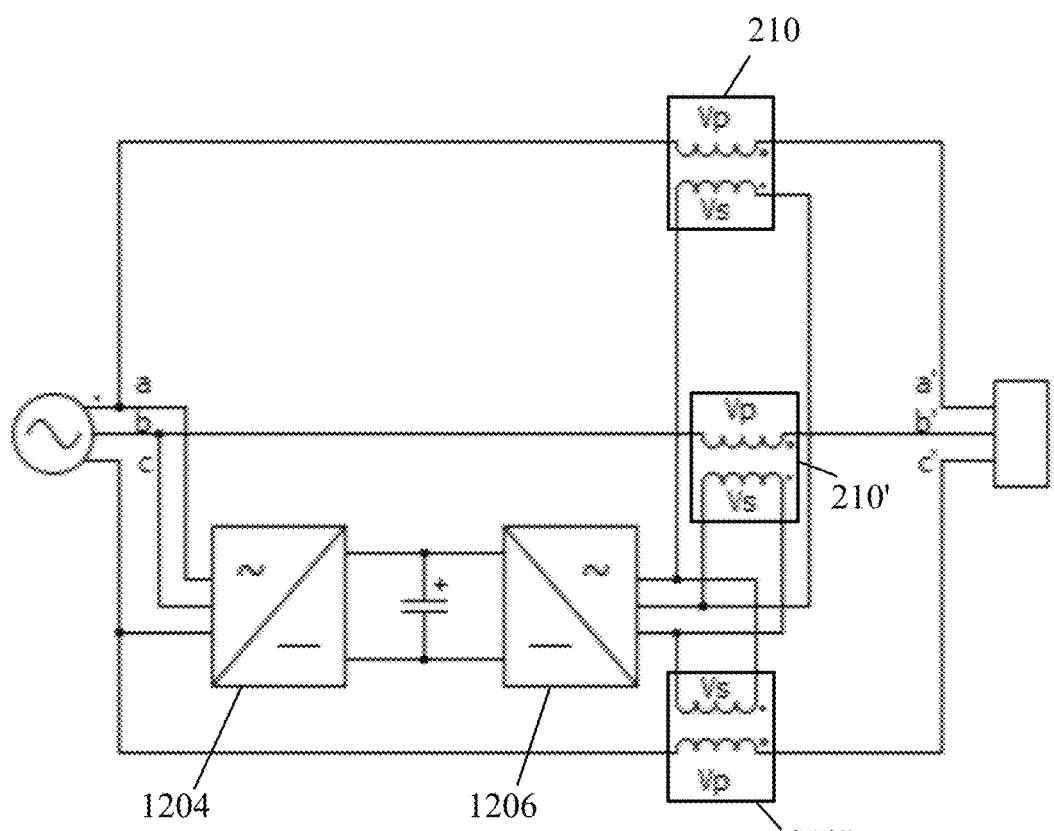
FIG. 12 illustrates a three phase unified power flow controller within an operational environment according to one example of the disclosure.

FIG. 12 illustrates another example of a three phase UPFC device 102 having three energy saving devices 205 incorporated therein. High frequency power converters may be provided to drive the transformers 210,210',210" by injecting voltage in-line with a voltage source $V_{in}$. According to one example, the energy saving devices 205 may be configured to buck or boost the voltage $V_{in}$. An active rectifier 1204 is provided on a grid side of the three-phase energy saving devices 205. The active rectifier 1204 includes an AC component and a DC component. An inverter 1206 is provided on a load side of the three-phase energy saving devices 205. The inverter 1206 includes a DC component and an AC component. The DC components of the rectifier 1204 and the inverter 1206 are independent with respect to each other and include capacitors and inductors. According to one example, the DC components of the rectifier 1204 and the inverter 1206 may include capacitors that store energy for subsequent discharge.

Figure 13:
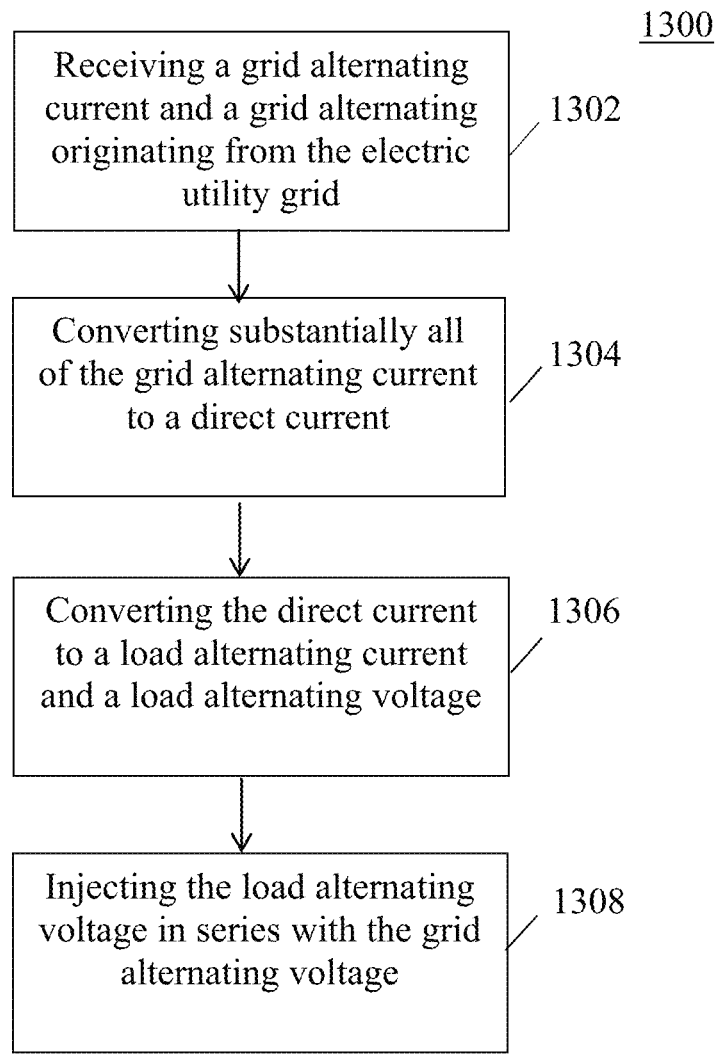
FIG. 13 illustrates a flowchart of an example method according to one example of the disclosure.

FIG. 13 is a flowchart of an example method 1300 according to the present disclosure. The method 1300 may be implemented using the above described systems. For example, the method 1300 may be implemented using a UPFC device 102 provided at the point of power consumption to regulate an AC voltage delivered to customer sites 101 from a generation facility.

The method 1300 may include receiving a grid alternating current and a grid alternating voltage originating from the electric utility grid at operation 1302. In operation 1304, substantially all of the grid alternating current is converted to a direct current. In operation 1306, the direct current is converted to a load alternating current and a load alternating voltage, wherein the load alternating voltage is less than the grid alternating voltage. In operation 1308, the load alternating voltage is injected in series with the grid alternating voltage.

Examples are described above with the aid of functional building blocks that illustrate the implementation of specified functions and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A unified power flow controller provided at a point of power consumption for regulating voltage received from an electric utility grid, the unified power flow controller comprising:
   a terminal electrically coupled to a power source that originates from the electric utility grid, the terminal receiving a grid alternating current and a grid alternating voltage;
   a power converter electrically coupled to the terminal, the power converter comprising:
      an active rectifier that converts substantially all of the grid alternating current to a direct current; and
      an inverter that converts the direct current to a load alternating current and a load alternating voltage, the load alternating voltage being less than the grid alternating voltage, the load alternating current including at least one of a load real power component and a load reactive power component;
   a transformer having first terminals electrically coupled to the power source and second terminals electrically coupled to an output of the inverter, the transformer being adapted to inject the load alternating voltage in series with the grid alternating voltage; and
   a switch provided across the first terminals of the transformer to bypass the transformer and provide the grid power source directly to the point of power consumption.

2. The unified power flow controller of claim 1, wherein the transformer injects the load alternating voltage in-phase with the grid alternating voltage to increase a value of the grid alternating voltage delivered to the point of power consumption.

3. The unified power flow controller of claim 1, wherein the transformer injects the load alternating voltage out-of-phase with the grid alternating voltage to decrease a value of the grid alternating voltage delivered to the point of power consumption.

4. The unified power flow controller of claim 1, wherein the inverter generates the load alternating current at a fixed frequency.

5. The unified power flow controller of claim 1, wherein the power converter further comprises an energy storage device that stores energy supplied by the direct current, wherein the energy storage device includes at least one of a battery or a capacitor.

6. The unified power flow controller of claim 1, further comprising a microcontroller that receives energy saving parameters at the point of power consumption, the energy saving parameters including at least one of a desired root-mean-square voltage value, a desired voltage reduction percentage, and a desired savings reduction percentage.

7. A method of regulating voltage at a point of power consumption, the voltage being received from an electric utility grid, the method comprising:
 receiving a grid alternating current and a grid alternating voltage originating from the electric utility grid;
 converting substantially all of the grid alternating current to a direct current;
 converting the direct current to a load alternating current and a load alternating voltage, the load alternating voltage being less than the grid alternating voltage;
 injecting the load alternating voltage in series with the grid alternating voltage in a first configuration; and
 providing the grid power source directly to the point of power consumption in a second configuration.

8. The method of claim 7, wherein the load alternating voltage is injected in-phase with the grid alternating voltage to increase a value of the grid alternating voltage delivered to the point of power consumption.

9. The method of claim 7, wherein the load alternating voltage is injected out-of-phase with the grid alternating voltage to decrease a value of the grid alternating voltage delivered to the point of power consumption.

10. The method of claim 7, wherein the load alternating current includes at least one of a load real power component and a load reactive power component.

11. The method of claim 10, wherein the load alternating current is generated at a fixed frequency.

12. The method of claim 7, further comprising storing energy supplied by the direct current, the energy being stored in at least one of a battery or a capacitor.

13. The method of claim 7, further comprising receiving energy saving parameters at the point of power consumption, the energy saving parameters including at least one of a desired root-mean-square voltage value, a desired voltage reduction percentage, and a desired savings reduction percentage.

14. A non-transitory computer-readable storage medium having stored therein instructions which, when executed by a microprocessor, causes a unified power flow controller provided at a point of power consumption to:
 receive a grid alternating current and a grid alternating voltage originating from the electric utility grid;
 convert substantially all of the grid alternating current to a direct current;
 convert the direct current to a load alternating current and a load alternating voltage, the load alternating voltage being less than the grid alternating voltage;
 inject the load alternating voltage in series with the grid alternating voltage in a first configuration; and
 provide the grid power source directly to the point of power consumption in a second configuration.

15. The non-transitory computer-readable storage medium of claim 14, wherein the instructions, when executed by the microprocessor, cause the unified power flow controller to inject the load alternating voltage in-phase with the grid alternating voltage to increase a value of the grid alternating voltage delivered to the point of power consumption.

16. The non-transitory computer-readable storage medium of claim 15, wherein the instructions, when executed by the microprocessor, cause the unified power flow controller to receive energy saving parameters at the point of power consumption, the energy saving parameters including at least one of a desired root-mean-square voltage value, a desired voltage reduction percentage, and a desired savings reduction percentage.

17. The non-transitory computer-readable storage medium of claim 14, wherein the instructions, when executed by the microprocessor, cause the unified power flow controller to inject the load alternating voltage out-of-phase with the grid alternating voltage to decrease a value of the grid alternating voltage delivered to the point of power consumption.

18. The non-transitory computer-readable storage medium of claim 14, wherein the instructions, when executed by the microprocessor, cause the unified power flow controller to store energy supplied by the direct current, the energy being stored in at least one of a battery or a capacitor.

19. The non-transitory computer-readable storage medium of claim 18, wherein the instructions, when executed by the microprocessor, cause the unified power flow controller to generate the load alternating current at a fixed frequency.

* * * * *